C. WEED.
Cut-Offs for Flexible Pipe.

No. 200,113. Patented Feb. 5, 1878.

WITNESSES.
W. J. Pratt.
L. A. Baxter.

INVENTOR.
Charles Weed
by Crosby Gregory
Attys

UNITED STATES PATENT OFFICE.

CHARLES WEED, OF CHARLESTOWN, MASSACHUSETTS, ASSIGNOR TO DAVIDSON RUBBER COMPANY.

IMPROVEMENT IN CUT-OFFS FOR FLEXIBLE PIPES.

Specification forming part of Letters Patent No. 200,113, dated February 5, 1878; application filed January 5, 1878.

*To all whom it may concern:*

Be it known that I, CHARLES WEED, of Charlestown, in the county of Suffolk and State of Massachusetts, have invented an Improvement in Cut-Offs for Flexible Pipe, of which the following is a description, reference being made to the accompanying drawings, forming part of this specification.

This invention relates to a cut-off device to stop the flow of liquid through flexible pipes used in medical apparatus and by chemists.

The invention consists in a cut-off composed of wire, bent, substantially as hereinafter described, to embrace the flexible pipe, a notch in one portion of the wire engaging a holding portion thereof, to retain the cut-off in position to stop the flow of a liquid or gas through the pipe.

Figure 1:
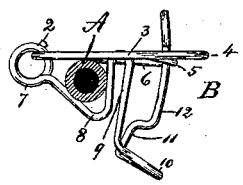
Figure 2:
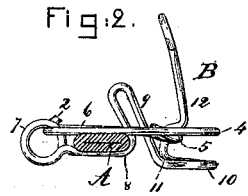
Figure 3:
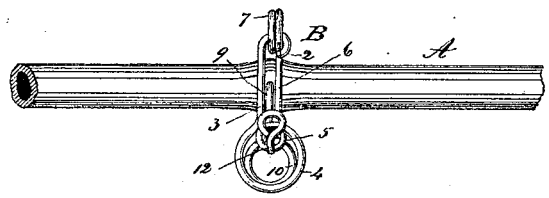

In the drawings, Figure 1 represents, in side elevation, one of my cut-off devices applied to a pipe, the device being open; Fig. 2, a view of the same closed upon the pipe; Fig. 3, a top view of Fig. 1; and Fig. 4, a modification.

A represents a pipe, of india-rubber or equivalent flexible material, through which a liquid or gas is to be passed. The cut-off B is composed preferably of spring-wire.

As shown in Figs. 1 to 3, this wire, commencing at the end 2, is carried forward, as at 3, bent into a finger-piece or eye, 4, then into a holding portion, 5, which engages the notched portion 11 of the loose spring end 12. Thence the wire is carried backward at 6, coiled at 7, to form a spring to keep separated the finger-piece and the thumb-piece 10. Then the wire is bent, as at 8, to receive the pipe between it and the portions 3 6, then turned backward, making a finger, 9, to enter preferably between the members 3 and 6. Then the wire is bent to form the thumb-piece 10, above which is the notched portion 11 of the spring end 12, the notch 11, when the finger-piece 4 and thumb-piece 10 are pressed together, catching upon the holding portion 5, thereby retaining the cut-off pressed together or closed upon the pipe, as shown in Fig. 2. When the flow of liquid or gas is to be kept up, the wire cut-off occupies the position in Fig. 1, or open.

This device is very simple in operation, and in its construction does away with the guide-eyes heretofore employed to surround the pipe in two places, a pinching device being arranged between the eyes.

Figure 4:
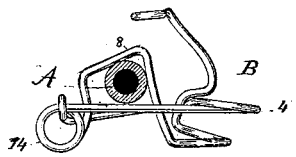

In Figs. 1 to 3 the tendency of spring 7 is to keep the cut-off open, so as to permit the flow of fluid or gas; but in Fig. 4 the spring 14 is arranged to keep the cut-off closed, and the catch, by engaging the finger-piece 4, holds the bent portion 8 open. The cut-off is formed of a single piece of wire; but it may be made of two or more pieces. One, however, is preferred.

I claim—

1. A cut-off composed of wire bent to form a spring, as at 7, a space for the tube at 8, a notch, as at 11, a holding portion to be engaged by the notch, and finger and thumb pieces, substantially as described.

2. As an improved article of manufacture, a cut-off for flexible pipe, said cut-off being of a single piece of wire, bent as shown and described, to be applied to the pipe, all as set forth.

In testimony whereof I have signed my name to this specification in the presence of two subscribing witnesses.

CHARLES WEED.

Witnesses:
CHAS. E. HIBBARD,
W. J. PRATT.